United States Patent [19]

Litt et al.

[11] 4,009,833
[45] Mar. 1, 1977

[54] SCRAP BATTERY PLATE RECLAIMING PROCESS

[75] Inventors: Terry D. Litt, Bay Village, Ohio; Richard C. Shelton, Whittier, Calif.; Earl J. Colwell, Willowick Lake, Ohio

[73] Assignee: ESB Incorporated, Philadelphia, Pa.

[22] Filed: Aug. 14, 1975

[21] Appl. No.: 604,730

[52] U.S. Cl. .................................. 241/14; 241/175
[51] Int. Cl.² ...................................... B02C 17/08
[58] Field of Search ............ 136/174, 165; 241/14, 241/26, 30, 175, 284; 51/136, 136 V

[56] References Cited

UNITED STATES PATENTS

| | | | |
|---|---|---|---|
| 3,071,900 | 1/1963 | Balz | 51/163 |
| 3,423,884 | 1/1969 | Balz | 51/163 V |
| 3,456,886 | 7/1969 | Tremolada | 241/14 X |
| 3,553,900 | 1/1971 | McKibben | 51/163 V |

*Primary Examiner*—Granville Y. Custer, Jr.
*Attorney, Agent, or Firm*—Anthony J. Rossi; Gilbert W. Rudman; Gary V. Pack

[57] ABSTRACT

Lead-acid storage battery plates damaged during battery manufacture are placed in a trough having an upward slope. The trough is vibrated causing the non-metallic components of the plates to be shaken free from the metallic components of the plates with the non-metallic components being reduced in size during the vibration process. The non-metallic components of the plates are discharged from the trough as a fine powder through suitable openings in the bottom of the trough while the metallic components climb the trough and are discharged at the upper end of the trough.

7 Claims, 2 Drawing Figures

SCRAP BATTERY PLATE RECLAIMING PROCESS

BACKGROUND OF THE INVENTION

Lead-acid storage batteries comprise a number of positive plates and negative plates assembled as elements in a cell. There may be one or more cells in each battery. The battery plates comprise an open metallic grid of cast lead alloy to which is added a filling of lead salts, principally lead oxides, lead sulfates and some free lead. The filling, or active material, is added to the grid in the form of a water suspension or soft paste. After pasting, the plate is allowed to set for a day or more during which time the soft paste hardens.

Inevitably in the battery manufacturing process there are defective or damaged finished dry plates or elements which must be scrapped. It is, of course, desirable to reclaim as much of the scrap material as possible in order to bottom manufacturing costs.

One current method for processing defective or damaged plates or elements for scrap reclamation comprises placing the plates or elements in a melt-down kettle having a temperature about the melting point of lead. Approximately fifty percent of the grid metal or approximately 20 percent of the entire plate or element weight can be recovered as metallic lead in this melt-down process. The remaining fifty percent of grid metal together with the non-metallic components of the plates or elements are collected as dross in the melt-down process which must be further processed by an expensive smelting process for further metallic lead recovery.

The smelting process yields about 85 percent metallic lead from the dross with approximately 12 percent of the entire weight of the original scrap not recovered by these combined processes, i.e. melt-down and smelting.

In addition to the value of the non-recovered portions of the original scrap, the smelting operation costs the battery manufacturer about 50 percent of the entire value of the original plates or elements. It can thus be seen that a substantial savings can be obtained by avoiding the expensive smelting process.

Accordingly, an object of the present invention is to provide a simple, reliable and inexpensive process whereby scrap battery plates or elements can be reclaimed without the necessity of melting down and smelting the scrap battery plates as has been required heretofore.

For purposes of this disclosure, scrap battery plates are defined as any cured or non-cured, formed or unformed, wet or dry lead-acid battery plates scrapped for any reason, whether as individual plates or as completed elements or groups.

SUMMARY OF THE INVENTION

We have found that if scrap battery plates are placed in a trough having an upward slope or incline and vibrated, the battery active material breaks out of the metallic grids in a very complete fashion. This occurs whether the active material is wet or dry, cured or non-cured, formed or unformed. We have observed that the metal parts, e.g., grids, work up the incline of the trough whereas the active materials tend to work downwards. Stated another way, active material broken out of the metallic grids works itself vertically downwardly through the metallic grids so as to reach the bottom of the trough for discharge through openings provided in the bottom of the trough, while the grids work vertically upwardly so as to climb the ramp and be discharged therefrom. During the process, the active materials interact with the metal parts and with one another and are reduced to a fine powder.

Feed to the trough may be either wet, dry or mixed. To control dust emission, it may be desirable to add a small stream of water to the feed. Addition of a small stream of water also improves the efficiency of the process, however, water addition is not necessary to the operation of the process.

A grinding media may also be provided in the trough to improve the efficiency of the process by decreasing the time required to process scrap battery plates. It too, however, is not required as plates, grids and elements introduced into the trough will act as their own grinding media.

From the foregoing, it will be understood that a very convenient method for separating lead grids from battery active material has been discovered without the need for melting and smelting. The process in accordance with the invention has the added features that it requires little labor and the separated active materials of the battery plates are reduced to small grains or powders suitable for re-use by direct addition to paste mixing apparatus.

DESCRIPTION OF THE PREFERRED EMBODIMENT

Figure 1:
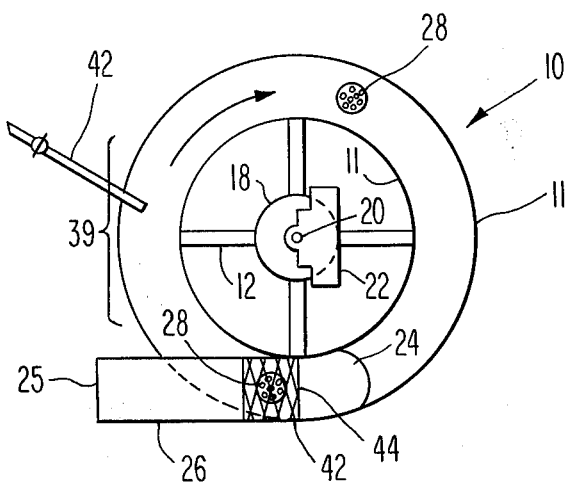
FIG. 1 is a plan view of an apparatus for practicing the method of the invention.
Figure 2:
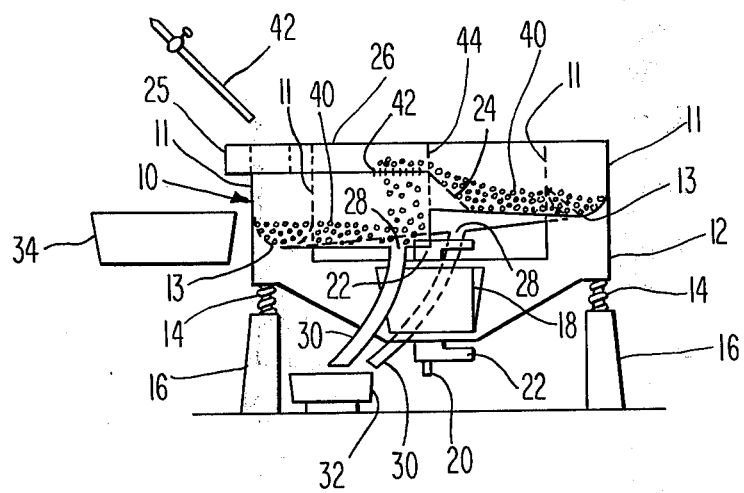
FIG. 2 is an elevation view of the apparatus of FIG. 1.

In FIGS. 1 and 2 a helical trough is shown generally at 10 having upstanding sides 11 and bottom 13. The trough 10 is mounted on a frame 12. The frame is supported by springs 14 and foundations 16. A motor 18 having a vertical shaft 20 is also mounted on frame 12. Two eccentric weights 22 are attached to shaft 20. When the motor 18 is energized, the motion of weights 22 imparts a circular vibrating motion to the trough 10. The slope of the bottom of trough 10 is uniform except for a short steep ramp or dam 24 at the upper end of the trough. The ramp feeds a discharge chute 26. Two openings 28 having a screen with a series of small holes therein allow active material in wet or dry form to flow out of the trough. Chutes 30 direct the active material to a pan 32 where it is collected for re-use. A second pan 34 collects the grids dropping from the discharge end 25 of chute 26. In operation, damaged battery plates and other scrap material are fed to the trough 10 at the general area indicated by 39. The plates slowly ascend the slope of the trough in the direction of the arrow and as they do so, all non-metallic material is shaken from them. There is a build-up of grid parts just before ramp 24, forcing a stream of such parts up the ramp 24 out chute 26 and into the pan 34. Non-metallic materials tend to drift vertically down through the grinding media in the trough 10, pass out through openings 28 into chutes 30 and into pan 32. During the passage of the non-metallic particles down the trough, they rub together and rub on the ascending lead parts with the result that they are broken up into fine powder, or grains. The largest has been measured to be no greater than 500 microns in diameter. It has been found that separation occurs whether the plates are wet or dry, formed or unformed. However, with dry plates, there is an undesirable emission of dust from the apparatus. It has been found that a small trickle of water fed into the trough with the battery plates as at 42 eliminates the dust problem and aids in the efficiency of the process.

The separating trough for carrying out the method of the invention need not be circular. In certain installations, it may be more convenient to use a straight trough. Also, while openings 28 have been illustrated for the discharge from the trough of the separated active materials of the battery plates, it should be understood that the bottom 13 of the trough may be partially or wholly formed of a screen having an appropriate mesh.

In order to improve the efficiency of the separation process by decreasing the time required for treating the scrap battery plates, a grinding media may be provided in the trough 10. Such a grinding media is illustrated in FIG. 2 by the reference numeral 40. For ease of illustration and clarity, the grinding media 40 is not illustrated in FIG. 1. The grinding media provided may comprise any suitable material having a hardness greater than the materials introduced into the trough 10, as for example, steel or alumina balls or cylinders. Alumina balls or cylinders are preferred for the reason that they are non-contaminating. The grinding media serves to speed the pulverizing of the active materials of the scrap battery plates as well as aiding in the separation of the active materials from the lead grids. The grinding media 40 tends to build up and work itself up the ramp 24 just as the grid parts do. The grinding media passes through a screened area 42 provided in the forward end 44 of chute 26 and returns to the lowermost part of the trough 10.

The metallics collected in pan 34 may be fed to a grid casting pot or other lead melting facility while the non-metallics collected in pan 32 may be fed to a paste mixing operation.

We have found that a suitable slope for the trough is a rise of 8 inches in 142 inches or 2.4°. A helicoid trough 14 inches wide, 16 inches or more deep and having a mean diameter of 61 inches vibrated with an excursion of about ⅛ inch with a 20 HP motor turning at approximately 1750 RPM will separate up to 2000 lbs of scrap plates into bare metal and non-metallics per hour.

Having fully described our invention, we claim:

1. A scrap battery reclaiming process which comprises separating scrap battery plates into metallic and non-metallic materials including the steps of:
    a. placing scrap battery plates comprising metallic and non-metallic materials into a trough, the trough having a gradual upward slope from a feed end to a discharge end and being provided with non-metallic material discharge means in the bottom thereof;
    b. vibrating the trough whereby non-metallic materials are broken free from the metallic materials of the scrap battery plates with the metallic portions moving up the slope of the trough to the discharge end of the trough and with the non-metallic materials being discharged through the non-metallic material discharge means in the bottom of the trough; and
    c. collecting the metallic materials of the scrap battery plates at the discharge end of the trough.

2. A scrap battery reclaiming process as defined in claim 1 wherein a grinding media is placed in the bottom of the trough to improve the efficiency of the process by decreasing the time required to separate the scrap battery plates into metallic and non-metallic materials.

3. A scrap battery reclaiming process as defined in claim 1 wherein water is added to the trough during the vibration thereof.

4. A scrap battery reclaiming process for separating scrap battery plates into metallic and non-metallic materials and for reducing the non-metallic material to particles of approximately 500 microns largest diameter or smaller which comprises:
    a. placing scrap battery plates comprising metallic and non-metallic materials into a trough, the trough being resiliently mounted, having a gradual upward slope from a feed end to a discharge end and being provided with non-metallic material discharge means in the bottom thereof;
    b. vibrating the trough whereby the scrap battery plates ascend the slope of the trough to the discharge end of the trough and all non-metallic material in the scrap battery plates is shaken free from the metallic materials of the scrap battery plates, is reduced to particles of approximately 500 micron largest diameter or smaller and is discharged through the non-metallic material discharge means in the bottom of the trough; and
    c. collecting the metallic materials of the scrap battery plates at the discharge end of the trough.

5. A scrap battery reclaiming process as defined in claim 4 wherein a grinding media is placed in the bottom of the trough.

6. A scrap battery reclaiming process as defined in claim 5 wherein the grinding media comprises alumina.

7. A scrap battery reclaiming process as defined in claim 5 wherein water is added to the trough during the vibration thereof.

* * * * *